(12) United States Patent
Boice, Jr.

(10) Patent No.: US 6,953,156 B1
(45) Date of Patent: Oct. 11, 2005

(54) IRRIGATION METHOD FOR SLOPING LAND

(76) Inventor: Nelson R. Boice, Jr., 534 Manor Rd., Maitland, FL (US) 32751

(\*) Notice: Subject to any disclaimer, the term of this patent is extended or adjusted under 35 U.S.C. 154(b) by 0 days.

(21) Appl. No.: 10/987,879

(22) Filed: Nov. 15, 2004

Related U.S. Application Data

(60) Provisional application No. 60/583,350, filed on Jun. 29, 2004.

(51) Int. Cl.[7] .................... B05B 17/00; B05B 15/00; A01G 27/00; E02B 11/00; E02B 13/00
(52) U.S. Cl. ................... 239/1; 239/145; 239/542; 405/41; 405/51
(58) Field of Search ................. 239/1, 145, 542, 239/548, 553.3; 405/41, 51, 36, 40; 137/236.1

(56) References Cited

U.S. PATENT DOCUMENTS

| | | | | |
|---|---|---|---|---|
| 3,518,831 A | \* | 7/1970 | Tibbals, Jr. et al. | ............ 405/37 |
| 3,912,165 A | \* | 10/1975 | Pira | ............ 239/11 |
| 3,917,166 A | \* | 11/1975 | Hildebrandt et al. | ............ 239/1 |
| 3,995,436 A | \* | 12/1976 | Diggs | ............ 405/129.1 |
| 4,423,838 A | \* | 1/1984 | Dinur | ............ 239/1 |
| 5,039,251 A | \* | 8/1991 | Schlueter et al. | ............ 405/39 |
| 5,040,729 A | | 8/1991 | Carrozza | |
| 5,069,388 A | \* | 12/1991 | Prassas et al. | ............ 239/145 |
| 5,458,712 A | | 10/1995 | DeFrank | |
| 5,845,229 A | | 12/1998 | Rawlins | |
| 6,236,938 B1 | | 5/2001 | Atkinson et al. | |
| 6,308,902 B1 | | 10/2001 | Huntley | |
| 6,512,992 B1 | | 1/2003 | Fowler et al. | |
| 6,553,299 B1 | | 4/2003 | Keller et al. | |
| 6,606,542 B2 | | 8/2003 | Hauwiller et al. | |

\* cited by examiner

Primary Examiner—David A. Scherbel
Assistant Examiner—Darren Gorman
(74) Attorney, Agent, or Firm—William M. Hobby, III

(57) ABSTRACT

A method for providing efficient uniform delivery of a predetermined amount of water needed for a specific crop planted on sloping land using an irrigation system laid out following a topographical map to maintain a constant pressure head for all of the discharge points over the length of the irrigation hose having a gradient drop in the hose to allow delivery of a predetermined amount of water for a specific crop planted on sloping land.

13 Claims, 2 Drawing Sheets

IRRIGATION METHOD FOR SLOPING LAND

This application claims the benefit of U.S. provisional application, No. 60/583,350 filed Jun. 29, 2004.

BACKGROUND OF THE INVENTION

The present invention relates to a method for providing efficient uniform delivery of a predetermined amount of water needed for a specific crop planted on sloping land.

There have been a wide variety of irrigation systems in the past, such as underground irrigation systems having an underground pipe having sprinklers attached for irrigating a surrounding field or grove and drip irrigation systems. Center pivot irrigation systems are also commonly used today in the irrigation of large fields and these typically comprise a long water conduit which is pivotably connected at one end to a source of water under pressure. The conduit arm is carried in an elevated position by a plurality of spaced wheels or wheeled towers which are powered by hydraulic, pneumatic, or electric motors to rotatably sweep the central conduit over a circular pattern in a field. Center pivot and similar irrigation systems are not well adapted for sloping land since the wheeled towers that the system rides on cannot readily traverse unequal terrain.

Standard irrigation systems which layout irrigation pipes for distributing water through sprinklers, drip, ditches or other methods are also not well suited to sloping terrain because sloping pipes produce varying amounts of water pressure throughout the pipes and thus produces a wide variation in the amount of water distributed at any one point in the pipe. This can result in flooding and erosion of the soil when too much water is dispensed or there is an uneven distribution of water. If an irrigation hose extending down a slope is continuously filled with water, the pressure will increase at the bottom depending upon the amount of the drop. On the other hand, in continuously flowing water, the friction of the water running through the pipe tends to reduce the water pressure.

The present invention is designed to provide an efficient uniform delivery of a predetermined amount of water needed for a specific crop planted on sloping land that will not cause erosion or flooding and will provide an even distribution of water over the entire crop. This is accomplished by selecting a fertile piece of sloping land which has access to a water source, such as a stream, river, reservoir, or well, and obtaining a detailed topographical map and field survey of the field to be planted. From this map the length of the longest seed bed is determined and the maximum amount of water which must be delivered to that seed bed is calculated based on the number of plants and the irrigation requirements of the selected crop to be planted.

Using this maximum amount of water which must be carried by an irrigation hose, the required hose size can be determined. First, the hose pressure for the entire system is selected. Low pressure facilitates setting the header valve which controls the amount of water put into each irrigation hose and also leads to certain economies. Selecting, as an example, a pressure of one foot of head of water, less than one half pound per square inch, a one quarter inch diameter orifice will pass about three quarters of a gallon per minute, enough for about a 3000 foot long seedbed. Therefore, one quarter inch diameter hose is ample for this example.

The irrigation hoses are laid out gently crossing the contours of the slope to maintain a generally constant downward gradient to increase pressure to counteract the loss of pressure due to friction of the water running through the hose and to maintain the selected head of water pressure throughout the length of the hose. The reduction in water pressure due to friction is also dependent upon the finish of the interior surface of a particular hose as well as the interior diameter.

Prior art U.S. patents may be seen in the Fowler et al. U.S. Pat. No. 6,512,992 for an irrigation positioning system which includes a means of accurately determining the position of a selected location, such as at the end of a center pivot irrigation system by using two global positioning system (GPS) receivers. The Hauwiller et al. U.S. Pat. No. 6,606,542 provides for a system and method for creating agricultural decisions and application maps for automated agricultural machines. A system for creating application maps for controlling a dispensing apparatus based upon field data includes a system for maintaining the field data. The field data may be geo-referenced relative to geographic coordinates of the location of the field data. Application rate equations for correlating field data relative to desired output may be selectively defined based upon selected field data and desired output to produce application maps for a particular field.

The Carrozza U.S. Pat. No. 5,040,729 provides a sprinkler system which employs an articulated riser for adjustable sprinkler head positioning on an underground sprinkling system to compensate for ground irregularities by adjusting the position of the riser. The Huntley U.S. Pat. No. 6,308,902 is for a drip irrigation hose with emitters having different discharge rates. The hose has a water supply passage and a plurality of flow regulating channels manufactured into the hose that are smaller than the water supply passage. The flow regulating channels each comprise a predesignated geometry to provide a desired discharge rate at a given pressure and an inlet section comprising one or more openings connecting the water supply passage to that flow regulating channel and an outlet section comprising openings connecting that flow regulating channel to the exterior of the hose. The flow regulating channels have at least two different geometries to provide at least two different discharge rates at the given pressure.

The DeFrank U.S. Pat. No. 5,458,712 is a process for forming drip irrigation hose with pressure compensation. The Rawlins U.S. Pat. No. 5,845,229 is a method and apparatus for mapping crop quality. A harvester has a global positioning system that is used in the harvesting of crops. Fields to be harvested are divided into individual field areas for crop quality and values representing the location of the selected individual field areas or crop management areas are loaded into storage on a computer. The Atkinson et al. U.S. Pat. No. 6,236,938 is a system and method for creating maps using a GPS system. The system includes a computing device, a global positioning system receiver in communication with the computing device, and a range finder in communication with the computing device. The GPS receiver obtains a positioning location while a range finder is used to locate distances. The Keller et al. U.S. Pat. No. 6,553,299 is a method and apparatus for precision agriculture operations utilizing real time kinematic global positioning systems. Real time kinematic global positioning system technology is integrated with precision farming methodologies to provide accurate seeding, cultivating, planting and/or harvesting operations. The systems are used to control fully or semi-autonomous vehicles in the operation of the farm which allow for precision planting of seeds, precision weed removal as well as crop fertilization.

In contrast to the prior art, the present invention is directed towards a method of irrigating sloping land with an irrigation system laid out based on a topographical map to maintain a constant pressure head throughout the length of the hose by having the downward gradient at every point along the hose increase the pressure to offset the loss of pressure due to friction of the amount of water flowing through the hose at that point. This maintains a uniform pressure in the pipe to give an efficient uniform delivery of a predetermined amount of water needed for a specific crop planted on the sloping land which will not cause flooding or soil erosion and will allow the previously unused sloping land to be planted with a crop.

SUMMARY OF THE INVENTION

An irrigation process for sloping land includes the steps of selecting a section of sloping land for an irrigation system and then obtaining a topographical map and field survey of the selected sloping land. A plurality of irrigation hoses, one in each seedbed, are selected with each hose having a plurality of discharge points thereon for the discharging of water therefrom and having an upstream end portion and a downstream end portion. The irrigation hoses are laid on the sloping land following predetermined downhill paths to provide a downhill gradient to maintain a uniform water pressure and therefore a uniform water output at all points along the hose so that the irrigation system will provide a uniform discharge of water over the sloped land. The selected path of the hoses are selected to provide a gradient that will give a uniform pressure over the length of each hose to provide a uniform discharge of water from each of the discharge points.

The downstream end portion of each hose section is bent upward to form a generally vertically extending hose portion which is marked at a point above the end of the hose in the seedbed which is equal to the selected head pressure. The vertical hose portion may extend several feet above the mark to facilitate setting the header valve. The end of the turned up hose is left open so that foreign material may be purged from the system by high pressure water. Also, cleaning chemicals, brushes, or solid materials may be discharged through the hose for maintenance purposes.

Each hose's upper end is attached to a header pipe for dispensing water to each selected hose and includes a header valve for each hose for controlling the volume of water entering each selected hose.

The system also includes a water tank having a float valve for maintaining a relatively low water pressure to the header pipe. A header valve at each irrigation hose passes the proper amount of water into each hose, the amount depending on the length of the hose (seedbed) which is directly proportional to the length of the hose.

A GPS system may be used with the topographical map to control the machine that installs the irrigation hoses and follows through with other needed agricultural operations.

BRIEF DESCRIPTION OF THE DRAWINGS

Other objects, features, and advantages of the present invention will be apparent from the written description and the drawings in which.

DETAILED DESCRIPTION OF THE DRAWINGS AND METHOD

Figure 1:
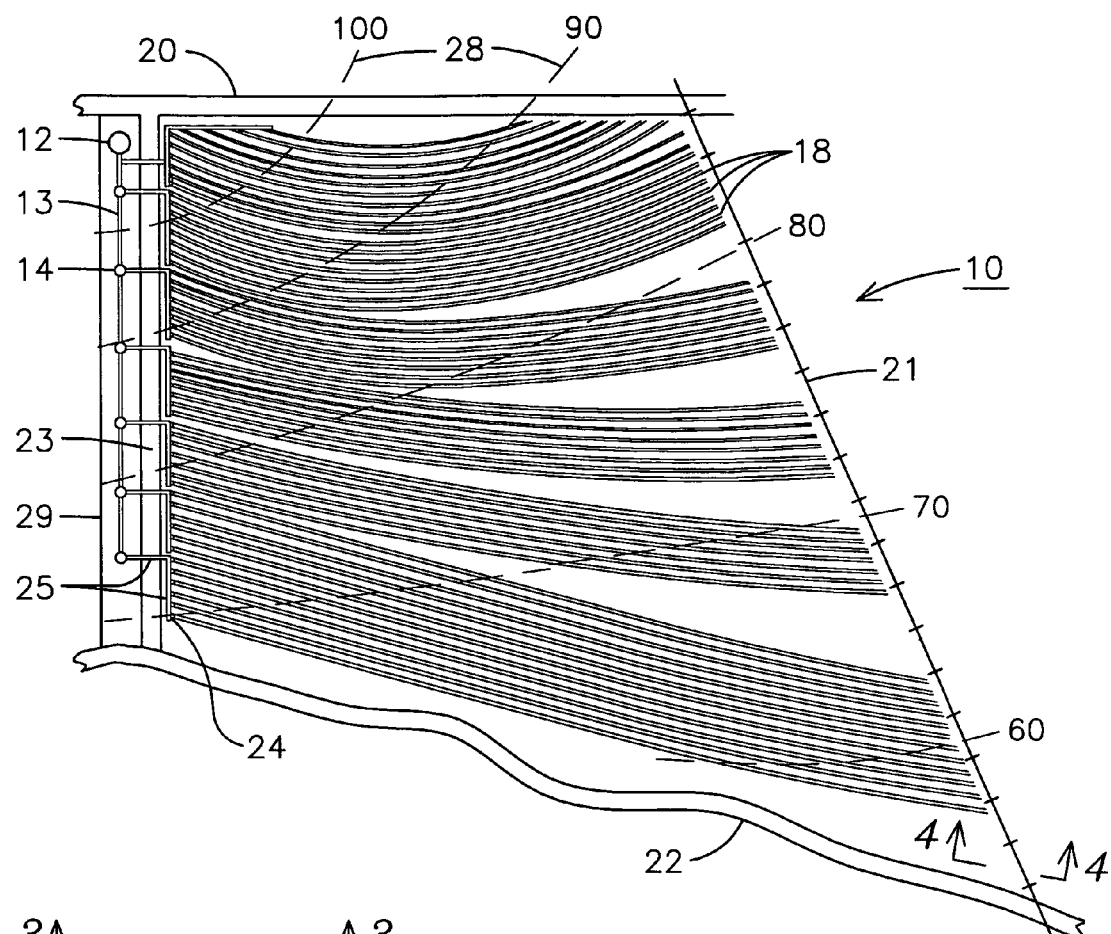
FIG. 1 is a top plan view of an irrigation system according to this invention, laid on land of varying downhill grades.
Figure 2:
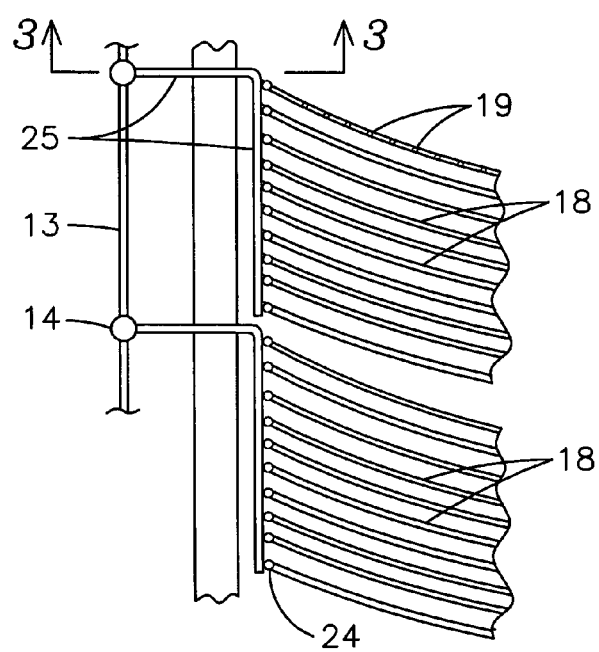
FIG. 2 is an enlarged detail view of a portion of FIG. 1.

FIG. 1 shows an example of a layout 10 of an irrigation system constructed according to the method of my invention, on sloping land of varying downhill grades, as indicated by contour lines 28, containing approximately 120 acres, bounded by a public road 20, a railroad 21, a stream 22, and a property boundary line 29 approximately 10 feet beyond a farm road 23. The method will provide efficient uniform delivery of a pre-determined water need for a specific crop planted on sloping land that may be unsuitable for level-basin, check flooding, or other types of irrigation and thus has not been used previously to grow crops.

Figure 3:
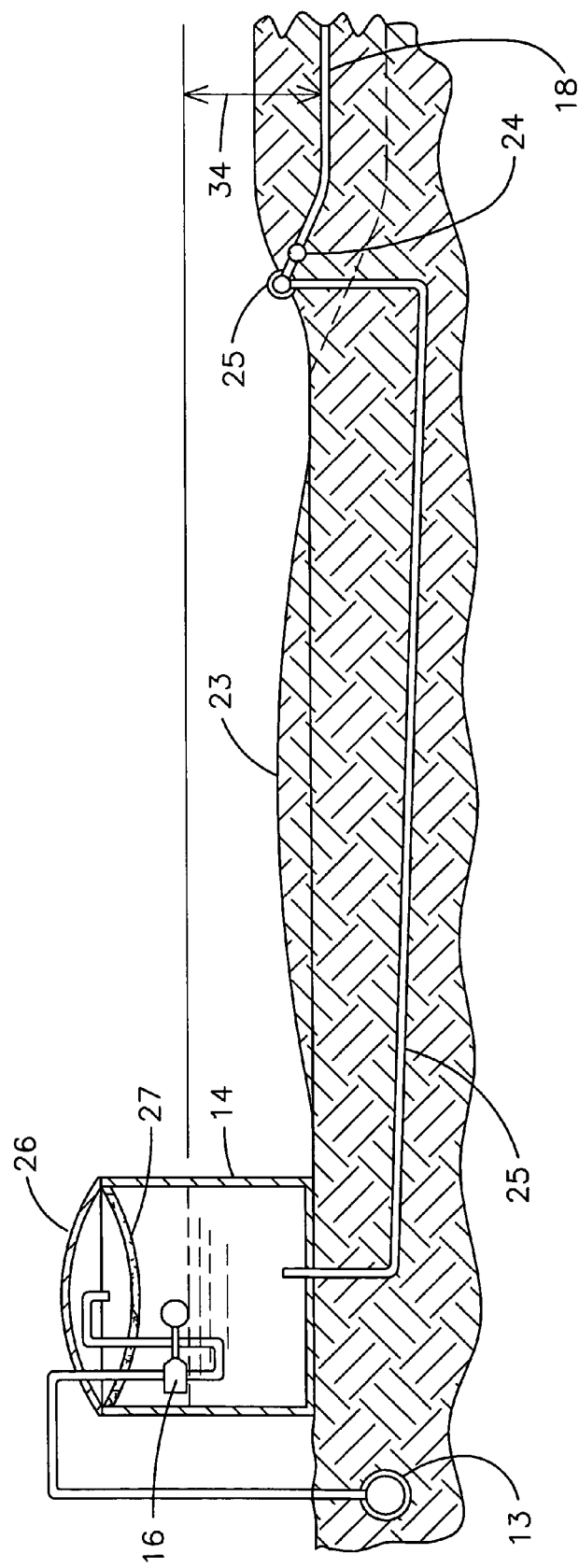
FIG. 3 is a vertical cross-sectional view taken from line 3—3 of FIG. 2.

A well 12 with pump, not shown, delivers water in series through pipe 13 to tanks 14 equipped with float valves 16, lids 26 and filters 27, indicated in FIG. 3. Alternatively, a single central filter could be provided at the pump. Float valves 16 are set to maintain a predetermined low pressure head in each tank 14 served by pipe 13. Tanks 14 deliver water through headers 25 to irrigation hoses 18 laid within downward sloping seedbeds 30. Ideally hoses 18 should be made of flexible material, such as soaker hosing, but drip hose with equally-spaced identical orifices or outlets 19 may be used. The setting of the connector valves 24 between header 25 and hoses 18 determines the amount of water entering each hose 18. The hose is manufactured to specifications that put out a given amount of water per unit of time per foot of hose with a given water pressures. Valve 24 can simply pinch the hose as a thumbscrew is turned or, an adjusting bolt can be used which screws into a valve throat to limit the amount of water entering the hoses 18.

The numbered dotted lines crossing hoses 18 in FIG. 1 are contour lines representing points of equal elevations. The seedbeds should gently angle across these contour lines to get the downhill gradient needed rather than sloping straight downhill. This gentle slope will prevent or significantly reduce erosion during heavy rainfall. The downhill path of each seedbed is precisely selected so that the increase in water pressure from the force of gravity produced by the drop in elevation at every point along the hoses 18 is equal to, and therefore, offsets the loss of water pressure due to friction of the flowing water against the inner surface of the hose at every point along the hose. Thus, the water pressure in each hose is constant throughout its length resulting in uniform water output all along the hose.

The amount of water put into each hose 18 is based on its length and is proportional thereto. As previously noted, the amount of water output per 100 feet of irrigation hose is determined by the manufacturer's specifications. The connector valve 24 is set to give each hose the amount of water it will put out based on its length. As water exits a hose along its length, the amount of water being carried decreases, as does the friction generated by the flow, thus the drop in elevation, or gradient, required to counteract the friction also decreases gradually. This results in the delivery of uniform amounts of water at all points along the hoses 18.

Figure 4:
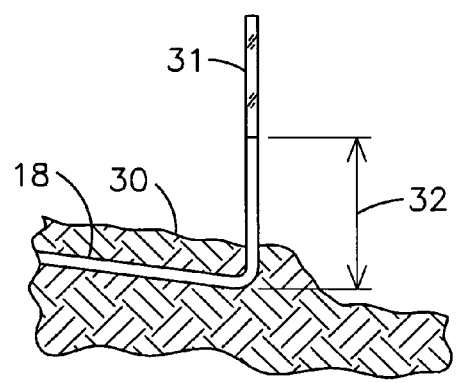
FIG. 4 is a cross-sectional view taken from line 4—4 of FIG. 1.

As shown in FIG. 4, the downstream end 31 of each hose 18 is turned upwards and has a transparent end portion 31 and is marked at a distance 32 equal to the selected systems head pressure. If the volume of water is adjusted perfectly by connector valve 24 for all existing conditions, water will fill the hose at the chosen head pressure and rise to the previously mentioned mark on the upturned end of the hose. The amount of irrigation water applied to a crop during a given period of time will depend on the percent of that period that the system is in operation. During operation, the volume of water can be fine-tuned by adjusting the connector valve 24 based on the level of water in the upturned end transparent portion 31 on the downstream end of hoses 18.

The header 25 from each tank 14 feeds a plurality of hoses 18 through valves 24. The number of hoses depends primarily on the topography but other factors are involved. The minimum header pressure 34 at all hoses at the header must be equal to or greater than the selected head pressure chosen for the system. Headers 25 may run downhill to serve a number of hoses 18, thereby increasing the pressure as a header loses elevation, which is acceptable so long as the pressure remains relatively low.

The irrigation hoses may be installed by a machine that rototills a strip of soil, approximately 3' wide, plows a seedbed 30 with furrows on each side, lays the hose 18 at the desired depth in the seedbed, dispenses the seeds or plants at the desired intervals, covers the seed, and compacts the soil. Irrigation with water containing fertilizer can start immediately. An irrigation system installed according to this invention can be made completely automatic with an electronic irrigation control device triggered by a soil moisture sensor such as a tensiometer.

It should be noted that the low pressure created by the tank and float valve is to reduce cost and to facilitate the accurate setting of valve 24, and does not control the pressure in the irrigation hoses 18 themselves. Their pressure is determined by the gradient of the hoses, the amount of rise of water level in the upturned lower end 31 of the hose, and the amount of water allowed into each hose by valve 24.

A more detailed method may include the following steps:
1. Select a fertile piece of sloping land which has access to a water source, such as a stream, river, reservoir or well;
2. Obtain a detailed topographical map and field survey of the field to be planted;
3. Determine the length of the longest seedbed in order to determine the maximum volume of water needed for any irrigation hose;
4. Determine the maximum amount of water which must be delivered to the seedbed, based on the length of the seedbed, the number of plants and the irrigation requirements of the selected crop to be planted therein;
5. Select a level of low water pressure desired to be maintained throughout the system, generally the lower the pressure the more economical and controllable;
6. Select the smallest inside diameter of hose that will carry the required amount of water using an orifice since the hose's gradient eliminates back pressure;
7. Determine empirically the downhill gradient at all points along the selected hose that is necessary to counter the loss of pressure at that point due to friction of the flowing water to maintain the selected head of water pressure throughout the length of the hose;
8. Lay out all seedbeds with their irrigation hoses in the chosen field using the topographical map and field survey so that the downhill gradient along each hose from point to point will maintain generally uniform water pressure throughout the length of the hose;
9. If the topography of the land in question does not provide sufficient downhill grade to maintain uniform water pressure in the hose for its entire length, a larger diameter tube to reduce friction can be used for all or a part of the hose's length;
10. For each set of adjacent seedbeds in the layout, provide a water storage tank equipped with a float valve to receive water from a high pressure main source and maintain the level within the tank to provide constant low water pressure at the selected level to the headers.

If the slope of the land is relatively uniform, the seedbed furrows will tend to be parallel to one another. If not, wedge-shaped pieces of land may necessarily be left unused in order to maintain the desired gradients.

The following is an example that illustrates the use of the foregoing process to provide irrigation for growing a crop of strawberries on sloping land:

Assume that the length of the longest seedbed is 1000 feet. Determine the amount of water required: according to the Strawberry Grower Association of Dade City, Fla., mature plants on 15 inch centers require ⅓ gallon per day. Thus, a 100 foot long seedbed divided by 15" for spacing gives 80 plants, at ⅓ gallon per day equals 27 gallons daily. Assuming 20 hours operation a day equals 1.35 gallons per hour per 100 feet or 13.5 gallons for a 1000 foot hose to meet the maximum irrigation requirement of the crop. If conditions are such that less irrigation is required, the daily operating time is reduced or eliminated. An irrigation hose manufactured to put out 1.35 gallon per hour would meet this requirement. A head of one foot is selected as the desired water pressure to be maintained in the hoses (a little less than ½ a pound per square inch). Select the smallest hose capable of delivering the required quantity of water. Testing confirms that a ¼ inch diameter orifice under a head pressure of one foot of water will pass over 40 gallons per hour, enough to supply a 3000 foot plus long seedbed. Find by empirical testing the degree of downhill gradient that is necessary to counter the internal friction of the flowing water and maintain a one-foot head of water pressure throughout the length of the hose.

If the header valve is properly set, the hose will be full and have a one foot head throughout and the water level will be at the "mark" on the upturned lower end. The water being noncompressible, a slight fine-tuning adjustment in the header valve should immediately be reflected in the upturned lower end, however, some time may be required for the change to stabilize throughout the hose and the ultimate effect observed.

Advantages of the system include low pressure irrigation with uniform pressure throughout the irrigation hose which results in major cost reductions in irrigation. The U.S. Dept. of Agriculture and the National RCS estimates that growers in La Junta, Colo., spend $650 to $1200 per acre to install typical drip irrigation systems utilizing pumps, filters, ejectors or tiny valves at intervals of 15" or so. The present method permits purging of foreign matter with high pressure water when needed and the use of soaker hose having innumerable orifices eliminates the need for filters and drip valves. The cost of the preset low pressure system using soaker hoses is substantially less than that of the typical drip system.

The present method of irrigation is more efficient in its use of water than other systems in use today. It has the capability of delivering exactly the needed amount of water at exactly the locations desired, for exactly the chosen period of time. Another advantage of the invention is that because it is adapted for use on sloping lands, the furrows automatically drain because of gravity. The layout which provides that each seedbed will have only enough gradient to offset the loss of water pressure due to friction means that damaging erosion from too steep a gradient will not occur. Also, the many furrows prevent the runoff from collecting into large streams which cause erosion. The use of soaker hosing avoids the disadvantage of possible clogging of drip-type irrigation valves. The open end, turned-up downstream ends 31 of the hoses 18 permit easy purging of solids with water at higher pressure by-passing the float valves, thereby eliminating the need for costly filters. The system advantageously uses low pressure and dual pressure.

The present method can be incorporated into a mechanized, computer-controlled system using the topographical and empirical data to automatically lay out the seedbeds and furrows at the proper grades, rototill the soil, lay the hose, plant the seeds, compact the soil, lay plastic groundcover and immediately irrigate with liquid fertilizer.

It should be clear at this time that a method of providing efficient uniform delivery of predetermined amounts of water needed for a specific crop planted on sloping land has been provided. However, the present invention is not to be considered as limited to the forms shown which are to be considered illustrative rather than restrictive.

I claim:

1. An irrigation process for sloping land comprising the steps of:
    selecting a section of sloping land for an irrigation system;
    obtaining a topographical survey map of the selected sloping land;
    selecting a plurality of irrigation hoses, each selected hose having a plurality of discharge points thereon and having an upstream end portion and a downstream end portion;
    laying each said selected hose in said selected section of sloping land on a predetermined downhill gradient to maintain a uniform water discharge from said hose at all points along said hose; and
    bending the downstream end portion of each said selected hose section to form a generally vertically extending hose portion to mark a predetermined height above the end of said hose section;
    whereby an irrigation system can provide a generally uniform discharge of water over the sloped land.

2. The irrigation process for sloping land in accordance with claim 1 in which the step of laying each of said plurality of hoses includes laying each hose over a selected gradient to provide a generally uniform pressure over the length of each said hose to provide a uniform discharge of water from each said discharge point.

3. The irrigation process for sloping land in accordance with claim 1 including selecting each said hoses downstream end portion with a transparent end portion.

4. The irrigation process for sloping land in accordance with claim 3 including selecting each said hose's downstream end portion with an open end.

5. The irrigation process for sloping land in accordance with claim 4 including the step of selecting a header pipe for dispensing water to each selected hose section and attaching each said selected hose section thereto.

6. The irrigation process for sloping land in accordance with claim 5 including the step of attaching each said selected header valve to said header pipe.

7. The irrigation process for sloping land in accordance with claim 6 including the step of adjusting each selected header valve based on the water level in said vertically extending hose portion.

8. The irrigation process for sloping land in accordance with claim 6 including the attaching said header pipe to a water supply including a water tank having a float valve maintaining the water level therein at a predetermined height for a predetermined outlet pressure.

9. The irrigation process for sloping land in accordance with claim 8 in which the step of selecting a header valve includes the step of selecting a low pressure header valve.

10. The irrigation process for sloping land in accordance with claim 1 in which the step of obtaining a topographical map includes plotting a downward gradient line for each hose to follow to provide a drop across the length of each hose section to offset the lost pressure from friction in the water passing therethrough.

11. The irrigation process for sloping land in accordance with claim 1 in which each selected hose is a soaker hose.

12. An irrigation process for sloping land comprising the steps of:
    selecting a section of sloping land for an irrigation system;
    selecting a plurality of irrigation hoses, each selected hose having a plurality of discharge points thereon and having an upstream end portion and a downstream end portion;
    obtaining a topographical survey map of the selected sloping land;
    plotting a downhill gradient line for each hose to follow to provide a drop across the length of each hose section to offset the lost pressure from friction of the water passing therethrough; and
    laying each said selected hose in said selected section of sloping land on said plotted downhill gradient for the selected hose to maintain a uniform water discharge from said hose at all points along said hose; whereby an irrigation system can provide a generally uniform discharge of water over the sloped land.

13. The irrigation process for sloping land in accordance with claim 12 including the step of bending the downstream end portion of each said hose section to form a generally vertically extending hose portion to mark a predetermined height above the end of said hose section.

* * * * *